United States Patent
Sasaoka

(10) Patent No.: US 8,320,724 B2
(45) Date of Patent: Nov. 27, 2012

(54) OPTICAL COMMUNICATION SYSTEM AND ARRANGEMENT CONVERTER

(75) Inventor: Eisuke Sasaoka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 283 days.

(21) Appl. No.: 12/690,496

(22) Filed: Jan. 20, 2010

(65) Prior Publication Data

US 2010/0195965 A1    Aug. 5, 2010

(30) Foreign Application Priority Data

Jan. 20, 2009 (JP) .............................. P2009-010217
Jun. 10, 2009 (JP) .............................. P2009-139251

(51) Int. Cl.
G02B 6/04 (2006.01)
G02B 6/02 (2006.01)

(52) U.S. Cl. ....................... 385/121; 385/126
(58) Field of Classification Search ............... 385/121, 385/126
See application file for complete search history.

(56) References Cited

U.S. PATENT DOCUMENTS

| | | | |
|---|---|---|---|
| 4,000,416 A | | 12/1976 | Goell |
| 4,026,693 A | * | 5/1977 | Sato ............................. 65/31 |
| 4,409,477 A | * | 10/1983 | Carl ......................... 250/227.26 |
| 4,820,010 A | * | 4/1989 | Scifres et al. ................... 385/43 |
| 5,155,790 A | * | 10/1992 | Hwang ......................... 385/121 |
| 5,216,738 A | * | 6/1993 | Feder ............................ 385/114 |
| 5,381,505 A | | 1/1995 | Fischietto et al. |
| 5,655,043 A | * | 8/1997 | Davies et al. ................. 385/119 |
| 5,712,941 A | | 1/1998 | Imoto et al. |
| 6,188,824 B1 | | 2/2001 | Teshima |
| 6,611,648 B2 | | 8/2003 | Kumar et al. |
| 6,925,239 B2 | | 8/2005 | Wang et al. |
| 7,072,532 B2 | * | 7/2006 | Watts ............................ 385/11 |
| 7,164,835 B2 | | 1/2007 | Matsuo et al. |
| 7,283,714 B1 | | 10/2007 | Gapontsev et al. |
| 7,289,707 B1 | | 10/2007 | Chavez-Pirson et al. |

(Continued)

FOREIGN PATENT DOCUMENTS

GB    2 138 165 A    10/1984

(Continued)

OTHER PUBLICATIONS

European Search Report issued in European Patent Application No. EP 10151183.0 dated Sep. 24, 2010.

(Continued)

*Primary Examiner* — Charlie Peng
(74) *Attorney, Agent, or Firm* — McDermott Will & Emery LLP

(57) ABSTRACT

The present invention relates to an optical communication system or the like, which comprises a multicore fiber with a plurality of cores that are two-dimensionally arrayed in a cross-section thereof. In the optical communication system, an arrangement converter, provided between a multicore fiber and an Optical Line Terminal (OLT) having light emitting areas arrayed one-dimensionally, comprises first and second end faces, and a plurality of optical waveguides. The optical waveguides are disposed such that one of the end faces coincides with the first end face and the other end face coincides with the second end face. In particular, the optical waveguide end face array on the first end face and the optical waveguide end face array on the second face are different, contributing to an optical link between network resources of different types.

14 Claims, 17 Drawing Sheets

U.S. PATENT DOCUMENTS

| | | | |
|---|---|---|---|
| 7,526,166 B2 | 4/2009 | Bookbinder et al. | |
| 7,755,838 B2 * | 7/2010 | Chaves et al. | 359/636 |
| 7,899,294 B2 | 3/2011 | Chen et al. | |
| 7,903,918 B1 | 3/2011 | Bickham et al. | |
| 8,189,978 B1 | 5/2012 | Bennett et al. | |
| 2002/0021501 A1 | 2/2002 | Kawashima et al. | |
| 2002/0126971 A1 | 9/2002 | Soufiane | |
| 2002/0176677 A1 | 11/2002 | Kumar et al. | |
| 2003/0031436 A1 | 2/2003 | Simmons et al. | |
| 2004/0252961 A1 | 12/2004 | Peuchert et al. | |
| 2005/0111801 A1 | 5/2005 | Garman et al. | |
| 2008/0013905 A1 | 1/2008 | Bookbinder et al. | |
| 2008/0056658 A1 | 3/2008 | Bickham et al. | |
| 2008/0205840 A1 * | 8/2008 | Wakabayashi et al. | 385/128 |
| 2009/0067793 A1 | 3/2009 | Bennett et al. | |
| 2011/0052129 A1 | 3/2011 | Sasaoka | |
| 2011/0206330 A1 | 8/2011 | Sasaoka | |
| 2011/0222828 A1 | 9/2011 | Sasaoka et al. | |
| 2012/0134637 A1 | 5/2012 | Imamura | |

FOREIGN PATENT DOCUMENTS

| | | |
|---|---|---|
| JP | 58 013504 | 7/1981 |
| JP | 60-230607 | 11/1985 |
| JP | 62-297809 | 12/1987 |
| JP | 63-065412 | 3/1988 |
| JP | 05-341147 | 12/1993 |
| JP | 10-104443 | 4/1998 |
| JP | 2008-534995 | 8/2008 |
| WO | WO 91/15786 | 10/1991 |
| WO | WO 2008/157341 A2 | 12/2008 |

OTHER PUBLICATIONS

International Search Report issued in International Patent Application No. PCT/JP2010/050523 on Feb. 16, 2010.

European Search Report issued in European Patent Application No. 10000304.5-2216, dated May 7, 2010.

English translation of International Preliminary Report on Patentability (Chapter I) issued in International Patent Application No. PCT/JP2010/050523 dated Aug. 25, 2011.

European Search Report issued in European Patent Application No. 10000304.5-2216/2209029, dated Jul. 1, 2010.

R.S. Romaniuk et al., "Multicore Optical Fiber Components," Proceedings of the SPIE, SPIE, US, vol. 722, Sep. 22, 1986, pp. 117-124, XP000198335.

European Search Report issued in European Patent Application No. EP 10151183.0 dated May 6, 2010.

United States Office Action, issued in U.S. Appl. No. 12/689,596, dated Feb. 23, 2012.

US Office Action issued in U.S. Appl. No. 12/689,596 dated Jul. 25, 2012.

US Office Action issued in U.S. Appl. No. 12/743,176 dated Jun. 18, 2012.

Thomson, R.R., et al. "Ultrafast-laser Inscription of a Three Dimensional Fan-out Device for Multicore Fiber Coupling Applications." Optics Express. Sep. 3, 2007. vol. 15. No. 18, pp. 11691-11697.

* cited by examiner

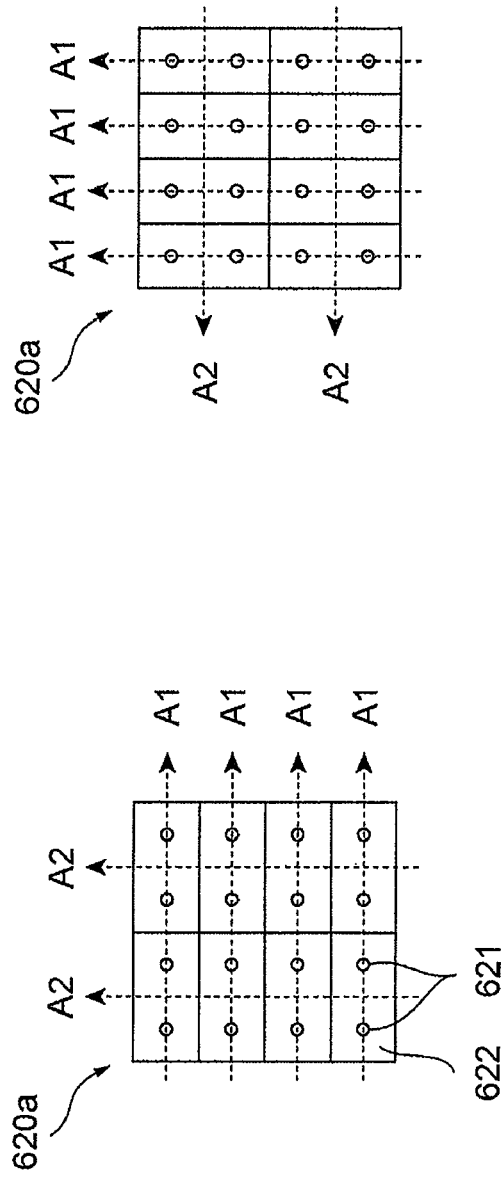
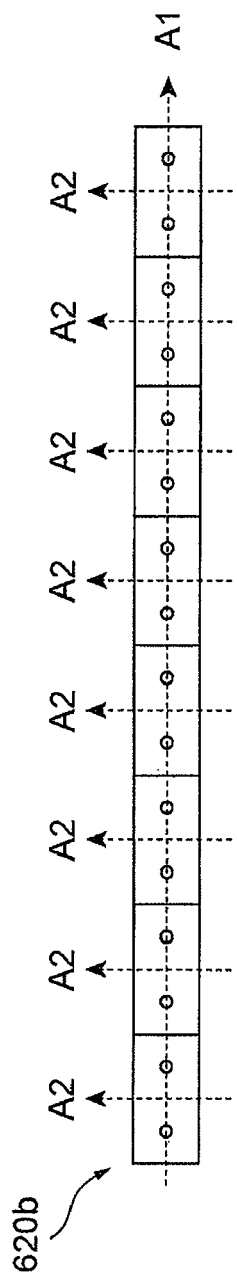
Fig.14A  Fig.14B  Fig.14C

OPTICAL COMMUNICATION SYSTEM AND ARRANGEMENT CONVERTER

BACKGROUND OF THE INVENTION

1. Field of the Invention

The present invention relates to an optical communication system that comprises, as part of an optical fiber network, a multi-core fiber having a cross-section in which a plurality of cores are two-dimensionally arrayed, and to an arrangement converter which serves as a connector that can be adopted by the optical communication system and which enables a favorable optical link between various network resources.

2. Related Background of the Invention

A so-called Passive Optical Network (PON) system, in which a single optical fiber is shared by customers by including a multistage optical splitter, as shown in FIG. 17, for example, has conventionally been implemented to provide FTTH (Fiber To The Home) services, which enables optical communications between a single transmitter station and a plurality of customers.

Namely, the PON system shown in FIG. 17 comprises a terminal station 1 (transmitter station), which is the final relay station of an existing communication system such as the Internet, and an optical fiber network that is laid between the terminal station 1 and a customer premises 2 (customer). The optical fiber network is configured by a closure (including an optical splitter 30) that is provided as a branching point, an optical communication line 12 from the terminal station 1 to the closure, and an optical communication line 31 from the closure to each customer premises 2.

The terminal station 1 comprises an Optical Line Terminal (OLT) 10 and an optical splitter 11 that splits a multiplexed signal from the OLT 10. Meanwhile, an Optical Network Unit (ONU) 20 is provided in the customer premises 2. At least the optical splitter 30 for further splitting an incoming multiplexed signal and a wavelength-selective filter for restricting the service content or the like are installed in the closure, which serves as a branching point, of the optical fiber network that is laid between the terminal station 1 and the customer premises 2.

As described above, in the PON system shown in FIG. 17, an optical splitter 11 is provided in the terminal station 1, and an optical splitter 30 is provided in the closure installed in the optical fiber network, and hence FTTH services can be provided for a plurality of customers by a single optical line terminal 10.

However, a PON system, in which a plurality of customers share a single optical fiber due to the inclusion of a multistage optical splitter as described above, is actually confronted by technical problems with regard to ensuring congestion control and securing a reception timing range, and the future addition of transmission capacity. A transition to an SS (Single Star) system is considered one means of solving such technical problems (ensuring congestion control and securing a timing range and so forth). Since transitioning to an SS system involves a greater number of fibers on the station side than in a PON system, ultra-small diameter and ultra-high density cables are required for the optical cables installed on the station side. Multicore fibers are suitable as the optical fibers for achieving a smaller diameter and an ultra-high density.

For example, as a multicore fiber, the optical fiber disclosed by Japanese Patent Application Laid-Open No. 05-341147 (Document 1) includes, in a cross-section thereof, at least seven two-dimensionally arrayed cores. Furthermore, Japanese Patent Application Laid-Open No. 10-104443 (Document 2) discloses an optical fiber which has a plurality of cores arranged in a straight line, and describes the fact that the connection between the optical waveguide and semiconductor optical integrated device is straightforward.

SUMMARY OF THE INVENTION

The present inventors have examined the above prior art, and as a result, have discovered the following problems.

That is, the multicore fiber that is described in Document 1 is hard to connect to an optical device or the like in a transmitter terminal or a receiver terminal. As is also described in Document 2, an optical device such as a normally manufactured optical waveguide or semiconductor optical integrated device typically has a plurality of optical transmission/reception elements (light emitting areas or light receiving areas) arrayed one-dimensionally, and it has proven difficult to optically link such an optical device to a multicore fiber which has a plurality of cores arrayed two-dimensionally in the cross-section thereof.

Furthermore, it is hard for the multicore fiber described in Document 2 to increase significantly the number of cores per multicore fiber. Namely, as disclosed in FIG. 1 and so forth of Document 2, there are at most four cores installed at suitable spacings. Therefore, as comparing such a case with a case where a plurality of cores are arranged two-dimensionally in a cross-section of the multicore fiber, any increase in the number of cores is clearly limited. Note that, as a method of arraying a plurality of cores in a straight line, reducing the core spacing may be considered; however, in view of crosstalk between adjacent cores, the minimum value for the core spacing that can be applied to an optical communication system is limited according to the length and communication quality of the fiber.

The present invention has been developed to eliminate the problems described above. It is an object of the present invention to provide an optical communication system which adopts a multicore fiber that includes, as part of an optical fiber network, a plurality of two-dimensionally arrayed cores, as well as an arrangement converter which serves as a connector to enable a favorable optical link between a variety of constituent elements (network resources) in the optical communication system, and which has a structure that enables an optical link between network resources in which the arrays of light entry units and light exit units differ, and which alleviates the conventional limitations governing the number of optical waveguides.

The optical communication system according to the present invention comprises: a multicore fiber, which includes a plurality of cores each functioning as optically independent optical waveguides, and which has a cross-section in which the plurality of cores are two-dimensionally arrayed; and an optical device, which has a first end face that faces an end face of the multicore fiber. The optical device has a plurality of light transmission areas two-dimensionally arrayed while corresponding to the two-dimensional array of the plurality of cores in the multicore fiber, on the first end face thereof.

In the optical communication system according to the present invention, the optical device may has a plurality of photoelectric conversion devices that are arranged differently from the core array of the multicore fiber, and an arrangement converter which includes the first end face, a second end face that faces the plurality of photoelectric conversion devices, and a plurality of optical waveguides both end faces of which are fixed on the first and second end faces respectively. The optical waveguide end face array of the arrangement converter coincides with a two-dimensional array of the plurality of cores in the multicore fiber on the first end face, but coincides with an array of the plurality of photoelectric conversion devices on the second end face.

In the optical communication system according to the present invention, the optical device may have, as a plurality of light exit portions, a plurality of light emitting devices provided in correspondence with a plurality of light emitting areas which are two-dimensionally arrayed on a light exit face. Further, the optical device may have, as a plurality of light entry portions, a plurality of light receiving devices provided in correspondence with a plurality of light receiving areas which are two-dimensionally arrayed on a light entry face.

The arrangement converter according to the present invention comprises: first and second end faces that are provided so as to' optically face each other, and a plurality of optical waveguides having one ends fixed on the first end face and the other ends fixed on the second end face. The array on the first end face, defined by the one ends of the plurality of optical waveguides, is different from the array on the second end face defined by the other ends of the plurality of optical waveguides.

In the arrangement converter according to the present invention, a spacing between adjacent optical waveguides may stay constant on each end face thereof and may differ between the first and second end faces.

In the arrangement converter according to the present invention, outer diameters of the respective core regions of the plurality of optical waveguides may be larger on the second end face than on the first end face. In the arrangement converter according to the present invention, an array of end faces of the plurality of optical waveguides may be a two-dimensional array at the first end face and a one-dimensional array at the second end face.

The arrangement converter according to the present invention may include a plurality of dual-core rectangular fibers. In this case, by bundling the respective one ends of the plurality of dual-core rectangular fibers, the first end face of the arrangement converter is constituted by these one ends. On the other hand, by bundling the respective other ends of the plurality of dual-core rectangular fibers, a second end face of the arrangement converter is constituted by these other ends. Note that each of the dual-core rectangular fibers comprises: two core regions each extending along a predetermined direction and functioning as an optical waveguide; a cladding region integrally surrounding the two core regions; and a resin coating provided on an outer periphery of the cladding region. Furthermore, in the dual-core rectangular fibers, an outer peripheral shape of the cladding region or an outer peripheral shape of the resin coating in a plane that is orthogonal to a predetermined direction is formed into a substantially rectangular shape which is defined by a long-axis direction that passes through a center of the two core regions and a short-axis direction that is orthogonal to the long-axis direction in the middle of the two core regions. In particular, in the arrangement converter, the respective one ends of the plurality of dual-core rectangular fibers are disposed such that the short-axis directions thereof coincide with each other as the first end face. Furthermore, the respective other ends of the plurality of dual-core rectangular fibers are disposed such that the long-axis directions thereof coincide with each other as the second end face.

On at least one of the first and second end faces, the respective ends of the plurality of dual-core rectangular fibers may be disposed in a state of contact with each other. Each of the end faces of the dual-core rectangular fibers can also be secured by way of an adhesive, but by directly fusing the end faces through heating, the core region spacings on the end faces of the arrangement converter (at least one of the first and second end faces) can be precisely regulated.

The arrangement converter according to the present invention may comprises a guide member that holds, on at least one of the first and second end faces, the respective ends of the plurality of dual-core rectangular fibers in a state where an array condition is maintained. In this case, the formation of the end faces of the arrangement converter (the array of dual-core rectangular fiber ends) is straightforward.

Furthermore, the spacing between adjacent core regions preferably stay constant on at least one of the first and second end faces. In a configuration in which the array converter comprises a guide member as mentioned earlier, the guide member may also be designed such that a spacing between adjacent core regions stays constant when the guide member holds the respective ends of the plurality of dual-core rectangular fibers.

In addition, in the arrangement converter according to the present invention, at least one of the first and second end faces may also be connected to an optical device for converting the core region spacing. Alternatively, the spacing between adjacent cores on at least one of the first and second end faces may be regulated by processing the ends of the plurality of dual-core rectangular fibers into a tapered shape in a state where the respective cladding regions having a substantially rectangular cross-section are integrated.

BRIEF DESCRIPTION OF THE DRAWINGS

FIG. 14A to 14C are views for explaining a schematic configuration of an arrangement converter according to a third modified example;

DESCRIPTION OF THE PREFERRED EMBODIMENTS

Figure 1:
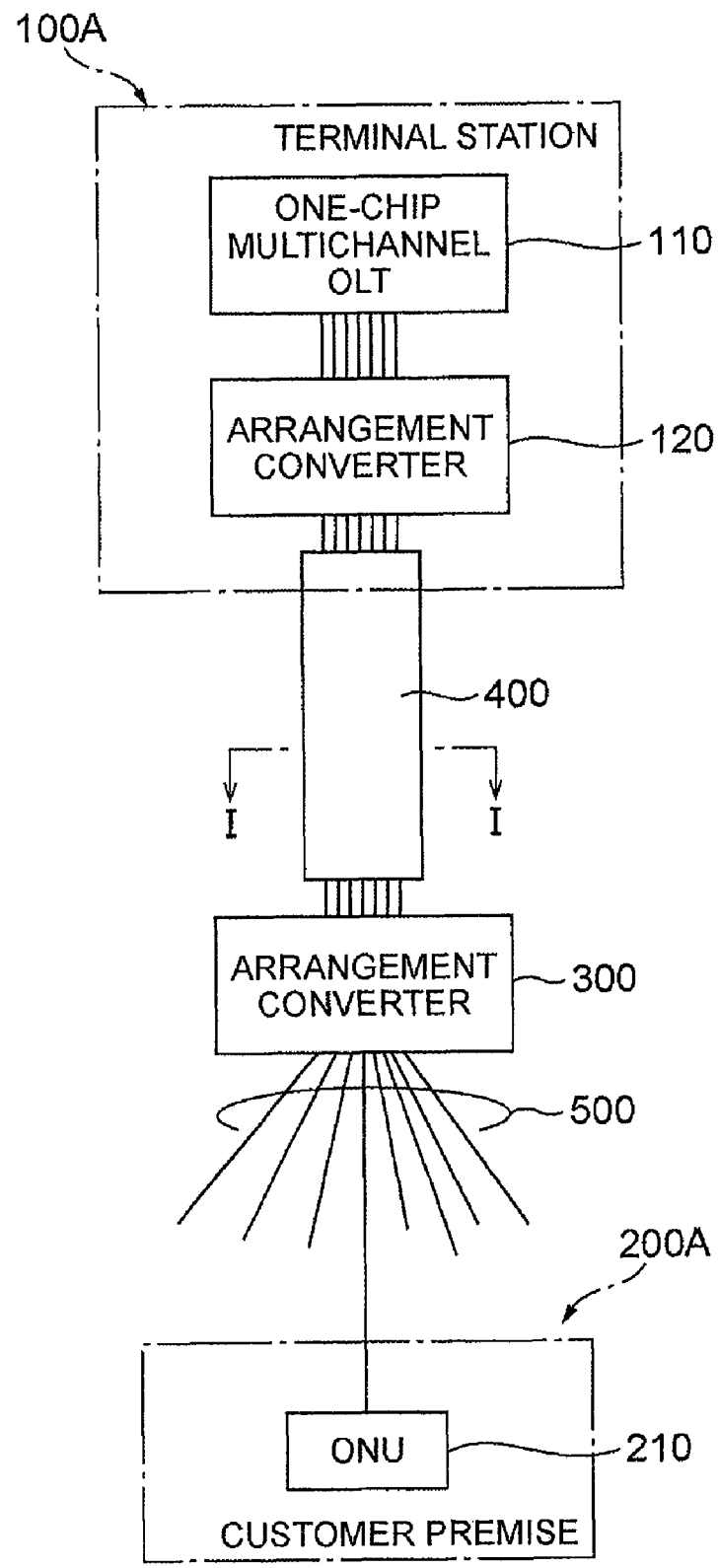
FIG. 1 is a view showing a configuration of a first embodiment of an optical communication system according to the present invention.

In the following, embodiments of an arrangement converter according to the present invention an optical communication system that includes the arrangement converter will be explained in detail with reference to FIGS. 1, 2, 3A-3D, 4, 5, 6A-7B, 8, 9A-9C, 10 and 11A-16B.

In the description of the drawings, identical or corresponding components are designated by the same reference numerals, and overlapping description is omitted.

First Embodiment of the Optical Communication System

Figure 17:
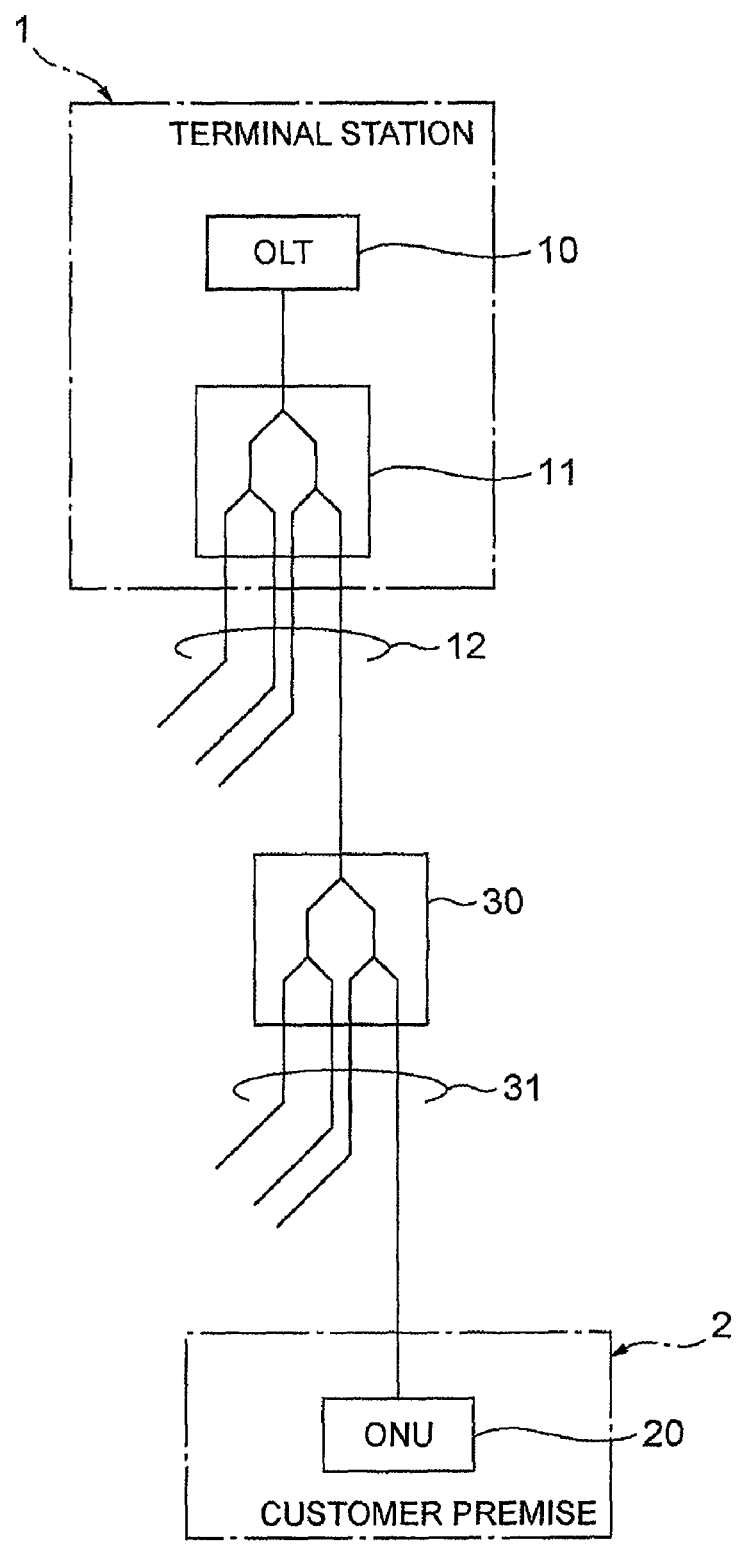
FIG. 17 is a view showing a configuration of a conventional optical communication system (PON system).

FIG. 1 is a view showing a configuration of a first embodiment of an optical communication system according to the present invention. The optical communication system according to the first embodiment provides, as per FIG. 17, FTTH (Fiber To The Home) services that enable optical communications between a single transmitter station and a plurality of customers. Note that the optical communication system shown in FIG. 1 is an SS (Single Star) system that outputs a plurality of signal channels from a transmitter station via a multicore fiber.

Namely, the SS system according to the first embodiment comprises a terminal station 100A (transmitter station), which is an endpoint relay station of an existing communication system such as the Internet, a customer premises 200A (customer), and a multicore fiber 400, which constitutes part of an optical fiber network that is laid between the terminal station 100A and the customer premises 200A (customer), and which includes a plurality of cores (optical waveguide regions) that are two-dimensionally arrayed on the two end faces of the multicore fiber 400.

The terminal station 100A includes a one-chip multichannel OLT 110 (station side termination device) that has a plurality of light emitting areas 110a which are each individually drive-controlled and which are one-dimensionally arrayed, and that outputs signal light from the plurality of light emitting areas 110a, and an arrangement converter 120 which optically links a light exit face of the one-chip multichannel OLT 110 (a surface on which the plurality of light emitting areas 110a are arrayed) and a light entry face of the multicore fiber 400. The multicore fiber 400 is housed in an ultra-small diameter and ultra-high density optical cable on the terminal station 100A side. Meanwhile, an ONU 210 is provided at the customer premises 200A. In order to optically link the light exit face of the multicore fiber 400 to the ONU 210 on each of the customer premises 200A, an arrangement converter 300 is also provided between the light exit face of the multicore fiber 400 and the customer premises 200A. The arrangement converter 300 and each of the customer premises 200A are optically connected by each of the optical fibers that constitute a tape fiber 500.

In the terminal station 100A, the one-chip multichannel OLT 110 is a light emitting device in which sixteen light emitting areas 110a are one-dimensionally arrayed. The arrangement converter 120 is provided between the one-chip multichannel OLT 110 and the multicore fiber 400 in which sixteen cores are two-dimensionally arrayed. The arrangement converter 120 optically links, one-for-one, each light emitting area 110a of the one-chip multichannel OLT 110 to each core of the multicore fiber 400. In other words, the arrangement converter 120 comprises a plurality of optical waveguides, the respective one end faces of the optical waveguides being arrayed two-dimensionally on a first end face 120a, and the respective other end faces being arrayed one-dimensionally on a second end face 120b.

Figure 2:
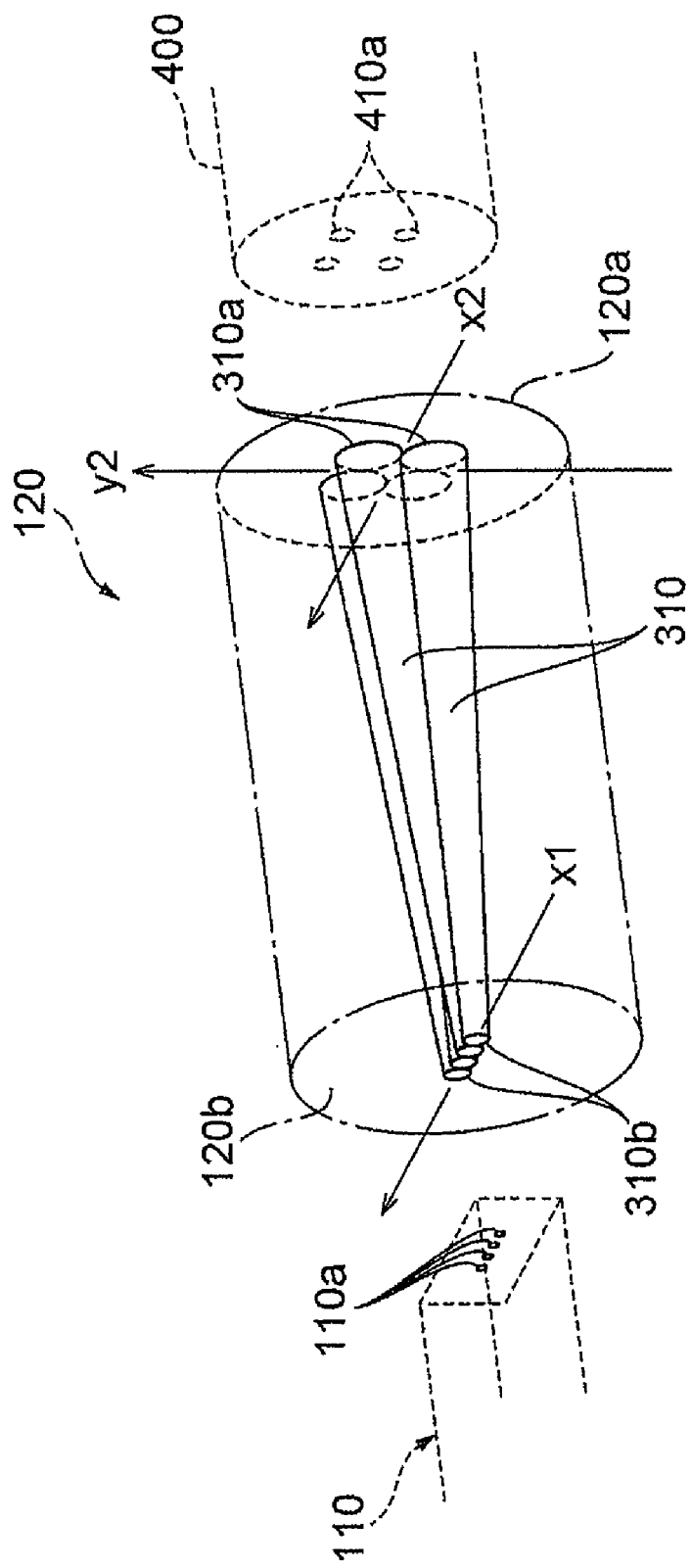
FIG. 2 is a view showing a schematic configuration of an embodiment (light entry end side of a multicore fiber) of an arrangement converter according to the present invention.

More specifically, the arrangement converter 120 comprises a structure such as that shown in FIG. 2. Namely, the arrangement converter 120 comprises first and second end faces 120a and 120b, and optical waveguide members 310 which include optical waveguides respectively and which are prepared in correspondence with each of the different signal channels. Note that, FIG. 2 shows four optical waveguide members 310 each being prepared for each signal channel and including an optical waveguide, but as long as the number of optical waveguide members matches or exceeds the number of signal channels outputted from the one-chip multichannel OLT 110, there are no particular restrictions on the number of optical waveguide members. Therefore, as mentioned earlier, in cases where the one-chip multichannel OLT 110 includes sixteen light emitting areas 110a (the number of signal channels is sixteen), sixteen or more optical waveguide members 310 may be provided. In the arrangement converter, 120, the first and second end faces 120a and 120b optically face each other so as to function of a light entry end and a light exit end respectively. Furthermore, each of the plurality of optical waveguide members 310 are disposed between the first and second end faces 120a and 120b so that one of the end faces 310a coincides with the first end face 120a while the other end face 310b coincides with the second end face 120b. At the first end face 120a, two-dimensionally arrayed core end faces and a plurality of optical waveguide members 310 are optically linked one-for-one at the light entry end face of the multicore fiber 400, while the other end faces 310a of the plurality of optical waveguide members 310 are held in a state of being two-dimensionally arrayed in a plane x2-y2 that defines the first end face 120a. Furthermore, on the second end face 120b, one of the end faces 310b of a plurality of optical waveguide members 310 are held in a state of being one-dimensionally arrayed along an axis x1 so that the one-dimensionally arrayed light emitting areas 110a of the one-chip multichannel OLT 110 and the plurality of optical waveguide members 310 are optically linked one-for-one. Note that FIG. 2 shows a one-chip multichannel OLT 110 in which light emitting areas 110a are one-dimensionally arrayed, but, in a light receiving device that comprises a plurality of light receiving areas, these light receiving areas may also be one-dimensionally arrayed.

More specifically, the configuration of each part of the arrangement converter 120 shown in FIG. 2 will be explained in detail with reference to FIGS. 3A to 3D. Note that FIG. 3A is an external view of each optical waveguide member 310, FIG. 3B is a cross-sectional structure of each of the optical waveguide members 310 along the line II-II in FIG. 3A, FIG. 3C shows an array state of end faces 310b of the optical waveguide members 310 on the second end face 120*b*, and FIG. 3D shows an array state of end faces 310*a* of the optical waveguide members 310 on the first end face 120*a*.

Figure 3A:
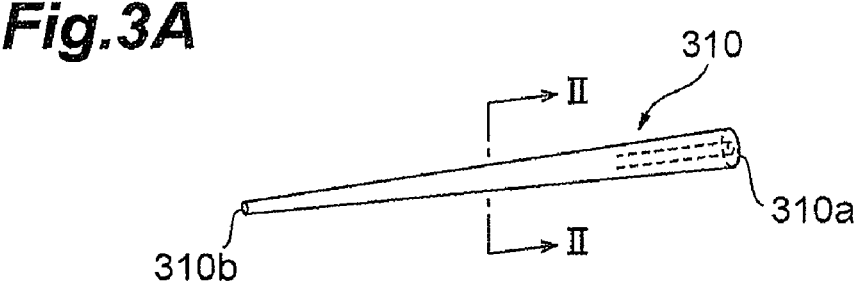
FIGS. 3A to 3D are views for explaining a configuration of each part of the arrangement converter shown in FIG. 2.
Figure 3B:
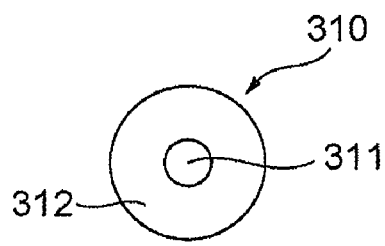
Figure 3C:
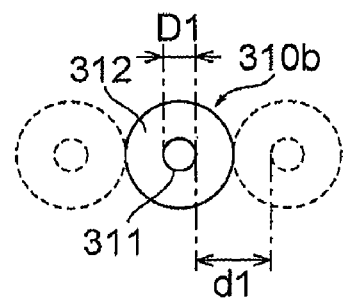
Figure 3D:
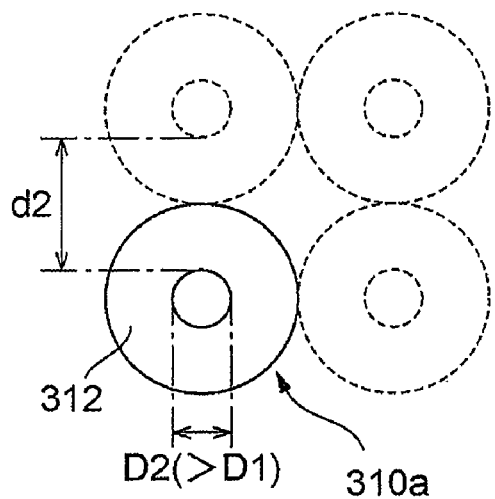

As shown in FIG. 3A, each of the optical waveguide members 310 has a tapered shape the cross-section of which widens in a direction from the one end face 310*b* toward the other end face 310*a*. Furthermore, as shown in FIG. 3B, the optical waveguide members 310 each comprise a core region 311 extending along a predetermined axis and functioning as an optical waveguide region, and a cladding region 312 provided on an outer periphery of the core region 311.

In a case where the cladding region 312 is provided on the outer periphery of the core region 311 as mentioned earlier, the optical waveguide pitch (array pitch of the core region 311) of the first and second end faces 120*a* and 120*b* can be regulated by regulating the thickness of the cladding regions 312 on each of the first and second end faces 120*a* and 120*b*. For example, as shown in FIG. 3C, the core regions 311 of diameter D1 (which coincide with the end faces 310*b* of the optical waveguide members 310) are one-dimensionally arrayed at a spacing of d1 by regulating the thickness of the cladding regions 312 on the second end face 120*b*. Meanwhile, on the first end face 120*a*, the core regions 311 of a diameter D2 (>D1) (which coincide with the end faces 310*a* of the optical waveguide members 310) are two-dimensionally arrayed at a spacing d2 by regulating the thickness of the cladding regions 312, as shown in FIG. 3D.

Four light emitting areas 110*a*, which are one-dimensionally arrayed, are optically linked to the one-dimensionally arrayed optical waveguide end faces 310*b* on the second end face 120*b*, by the arrangement converter 120 with the above configuration. Meanwhile, because the end faces 310*a* of the optical waveguides 310 are converted to a two-dimensional array on the first end face 120*a*, the optical waveguide end faces 310*a* two-dimensionally arrayed on the first end face 120*a* and a plurality of core end faces 400*a* of the multicore fiber 400 are optically linked.

The plurality of optical waveguide members 310 with the above configuration enable a favorable optical link between network resources of different types, and therefore an array of respective one end faces 310*a* on the first end face 120*a* and an array of respective other end faces 310*b* on the second end face 120*b* are held in different states. Furthermore, the exit position spacings or entry position spacings of the signal channels of each of the optically linked network resources are typically different. Therefore, as shown in FIGS. 2 and 3A to 3D, each of the plurality of optical waveguide members 310 has a shape which has a cross-sectional area that gradually increases or decreases from the first end face 120*a* toward the second end face 120*b*, that is, a shape such that an outer diameter of the cladding layer, i.e. coating layer, gradually increases or decreases. By processing the shape of each of the optical waveguide members 310 as a tapered shape in this manner, the number and array pitch of the optical waveguide end faces 310*a* and 310*b* on either of the first and second end faces 120*a* and 120*b* can be regulated to match the number and array pitch of the light entry and exit points, which differ depending on the network resources that are to be optically linked. Furthermore, because a two-dimensional array of the optical waveguide end faces of either of the first and second end faces 120*a* and 120*b* is permitted, with the arrangement converter 120, the restrictions on the number of optical waveguides are relaxed irrespective of the types of network resources that are to be optically linked. Note that the number and array pitch of the light entry and exit points that vary depending on the network resources are, for example, the number and array pitch of light emitting areas of a light emitting device, the number and array pitch of light receiving areas of the light receiving devices, and the number and array pitch of the end faces 400*a* of the plurality of cores in the multicore fiber, and so forth.

Figure 4:
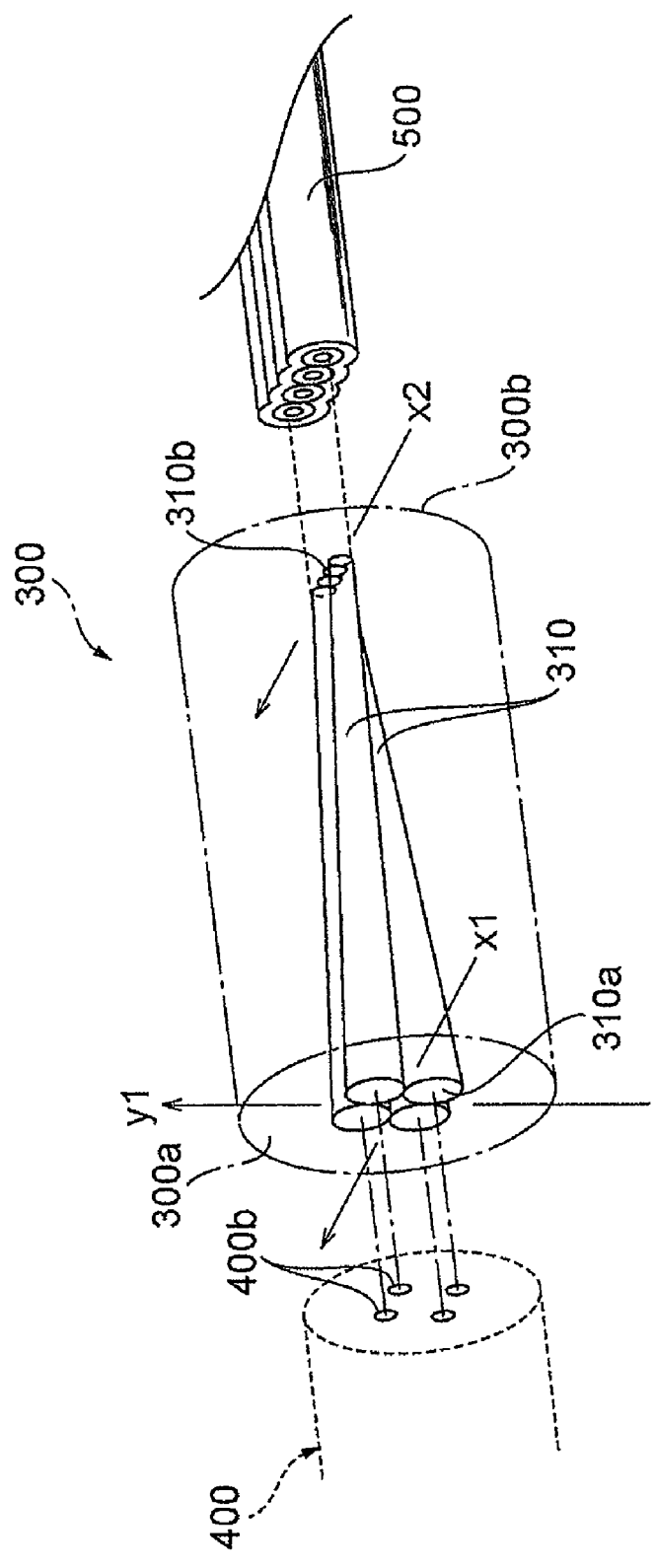
FIG. 4 is a view for explaining a configuration of another embodiment (light exit end side of the multicore fiber) of the arrangement converter according to the present invention.

FIG. 4 is a view showing the structure of the arrangement converter 300 that is installed on the light exit end side of the multicore fiber 400. The structure of the arrangement converter 300 is basically the same as that of the arrangement converter 120 mentioned earlier. Namely, a plurality of cores, which are two-dimensionally arrayed on the light exit end face of the multicore fiber 400, are optically linked, outside the terminal station 100A, to the end faces 310*a* of the plurality of optical waveguide members 310 that are two-dimensionally arrayed on the first end face 300*a* (defined by a plane x1-y1) of the arrangement converter 300 serving as a connector. Meanwhile, the end faces 310*b* of the plurality of optical waveguide members 310, which are one-dimensionally arrayed along an axis x2 on a second end face 300*b* of the arrangement converter 300, are optically linked to the respective one ends of the optical fibers included in a tape fiber 500. The optical fibers of the tape fiber 500 are each cut in a suitable position and the other ends of each of the cut optical fibers are drawn into the corresponding customer premises 200A (and optically linked to the installed ONU 210).

More specifically, the arrangement converter 300 comprises a structure such as that shown in FIG. 4. Namely, the arrangement converter 300 comprises first and second end faces 300*a* and 300*b*, and optical waveguide members 310 which are prepared in correspondence with different signal channels and which include optical waveguides respectively. Note that FIG. 4 shows four optical waveguide members 310 each of which is prepared for each signal channel and includes an optical waveguide, but as long as the number of optical waveguides matches or exceeds the number of cores of the multicore fiber 400, there are no particular restrictions on the number of optical waveguide members. Therefore, in cases where the multicore fiber 400 includes sixteen cores (the number of signal channels is sixteen), sixteen or more optical waveguide members 310 may be provided. In the arrangement converter 300, the first and second end faces 300*a* and 300*b* are installed facing each other so as to function as a light entry end and a light exit end respectively. Furthermore, each of the plurality of optical waveguide members 310 are installed between the first and second end faces 300*a* and 300*b* so that one of the end faces 310*a* coincide with the first end face 300*a* while the other end faces 310*b* coincide with the second end face 300*b*. On the first end face 300*a*, respective one end faces 310*a* of a plurality of optical waveguide members 310 are held in a state of being two-dimensionally arrayed on the first end face 300*a* defined by the plane x1-y1 so that end faces 400*b* of a two-dimensionally arrayed plurality of cores of the multicore fiber 400 and a plurality of optical waveguide members 310 are each optically linked one-for-one. Furthermore, on the second end face 300*b*, the other end faces 310*b* of the plurality of optical waveguide members 310 are held in a state of being one-dimensionally arrayed along an axis x2 on the second end face 300*b* so that the respective end faces of the optical fibers in the tape fiber 500 (at the station-side end of the tape fiber 500, the plurality of optical fibers are integrally held in a one-dimensionally arrayed state) and the plurality of optical waveguide members 310 are optically linked one-for-one. Note that, in the arrangement converter 300, the plurality of optical waveguide members 310 each have a structure such as that shown in FIGS. 3A to 3D. Furthermore, in order for the respective optical waveguide members 310 on the second end face 300*b* of the arrangement converter 300 to be optically linked to the optical fibers of the tape fiber 500, the optical waveguide spacing (core spacing d1 in FIG. 3C) on the second end face 300b must be made to coincide with a core spacing of the tape fiber 500 (the spacing between the cores in the optical fibers included in the tape fiber 500). Hence, the outer diameter of the plurality of optical waveguide members 310 shown in FIG. 4 gradually decreases from the first end face 300a toward the second end face 300b.

Figure 5:
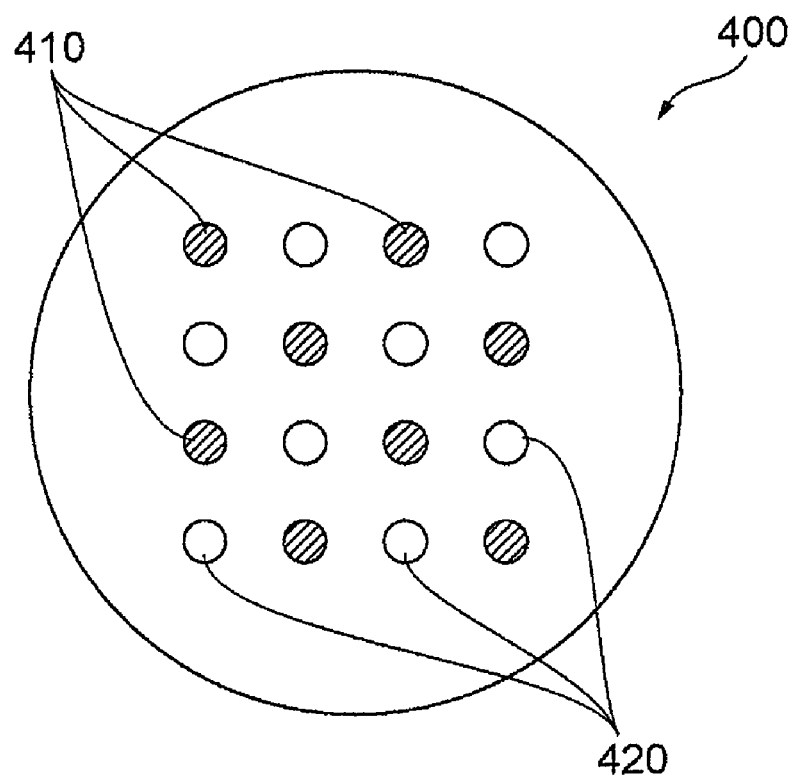
FIG. 5 is a view showing a cross-sectional structure of a multicore fiber along a line I-I shown in FIG. 1.

FIG. 5 is a view showing a cross-sectional structure along a line I-I of the multicore fiber 400 shown in FIG. 1. As shown in FIG. 5, the multicore fiber 400 includes a plurality of cores (sixteen cores in FIG. 5), but among these cores, the cores 410 belong to a first group that includes a predetermined optical characteristic and the core 420 belongs to a second group that includes an optical characteristic that differs from that of the first group. More specifically, the propagation constants are varied between cores by changing the core refractive index distribution and core diameter and so forth between the first and second groups. Furthermore, arranging cores 410 and 420 with different optical characteristics adjacent to one another in the multicore fiber 400 has the effect of suppressing crosstalk between adjacent cores. Note that FIG. 5 shows an example of uniform cladding but, by adopting a hole assist structure in which holes are provided in the outer peripheral side of each core, or by adopting a structure in which a trench is provided in the outer peripheral side of each core, bend loss can be reduced and a larger reduction in inter-core crosstalk is possible.

Next, an example of an arrangement converter fabrication method according to the present invention will be explained in detail hereinbelow with reference to the FIGS. 6A to 6E. Note that, in the following explanation, although an example in which an arrangement converter with four optical waveguide members is fabricated is shown as the arrangement converter 120 shown in FIGS. 2 and 3A to 3D, the arrangement converter 300 shown in FIG. 4 can similarly be fabricated.

First, four bared optical fibers, which have had the exterior resin coating removed, are prepared and, by extending each of these prepared bared optical fibers along a longitudinal direction thereof, optical waveguide members 310 of a tapered shape are formed. On one end face 310b of each of the optical waveguide members 310, the thickness of the cladding region is set at half the optical waveguide spacing d1 so that the spacing of the core region of each optical waveguide member 310 is d1 (see FIG. 3C). Meanwhile, on the other end face 310a of each of the optical waveguide members 310, the thickness of the cladding region is set at half the optical waveguide spacing d2 so that the spacing of the core region of each optical waveguide member 310 is d2 (see FIG. 3D).

Figure 6A:
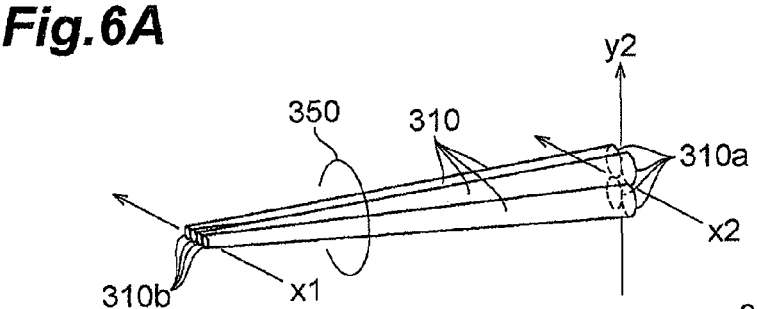
FIGS. 6A to 6E are views for explaining an example of a method of fabricating an embodiment of an arrangement converter according to the present invention.

The respective one end faces 310b of the four optical waveguide members 310, prepared as mentioned earlier, are one-dimensionally arrayed along the axis x1, while the respective other end faces 310a are two-dimensionally arrayed in the plane x2-y2, whereby an optical waveguide bundle 350 such as that as shown in FIG. 6A is obtained.

Subsequently, flat plate-shaped fixing members 320 and 330 composed of silica glass, zirconia or the like will be prepared. The fixing members 320 are members for fixing one end of the optical waveguide bundle 350 (the end face 310b side of the optical waveguide member 310) and which comprise a front side 320b, which corresponds to a second end face 120b of the arrangement converter, and a rear side 320a, which faces the front side 320b. Furthermore, the fixing member 320 is provided with a through-hole 320c for holding the end faces 310b of the optical waveguide members 310 in a state of being one-dimensionally arrayed along an axis x1.

Meanwhile, the fixing member 330 is a member which fixes the other end of an optical waveguide bundle 350 (the side of the end face 310a of the optical waveguide member 310) and which comprises a front face 330b and a rear face 330a which faces the front face 330b and corresponds to the first end face 120a of the arrangement converter. Furthermore, the fixing member 330 is provided with a through-hole 330c for holding an end face 310a side of the optical waveguide members 310 in a state of being two-dimensionally arrayed in the plane x2-y2.

Figure 6B:
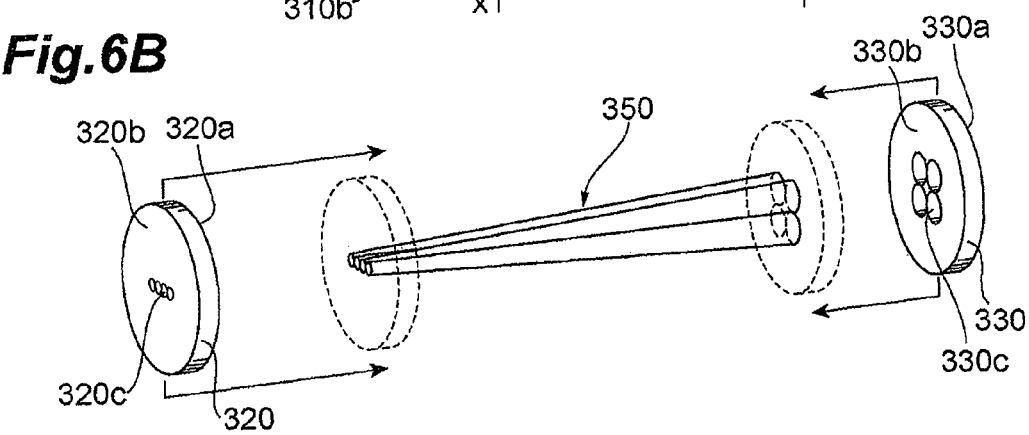
Figure 6C:
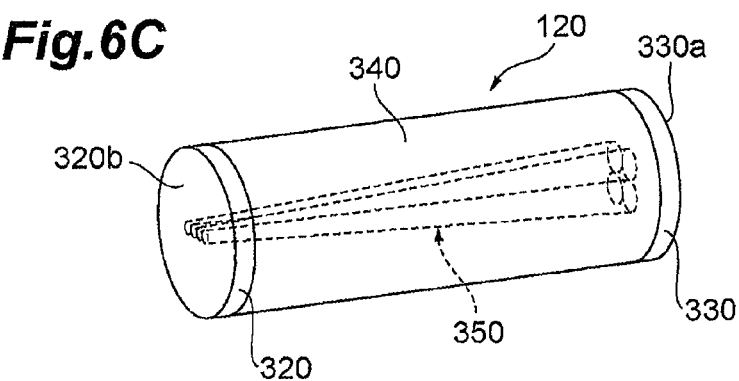

The fixing member 320 with the above structure is attached to one end of the optical waveguide bundle 350, while the fixing member 330 is attached to the other end of the optical waveguide bundle 350 (see FIG. 6B). By way of this configuration, the respective arrays of the tapered optical waveguide members 310 are maintained at a high density.

In addition, a resin 340 for protecting the whole of the optical waveguide bundle 350 is made to fill the space between the fixing members 320 and 330 that are attached to both ends of the optical waveguide bundle 350, whereby the surface of the optical waveguide bundle 350 is covered. Furthermore, the relative positions of the optical waveguide bundle 350 and the fixing members 320 and 330 are fixed by the resin 340 (see FIG. 6C).

Figure 6D:
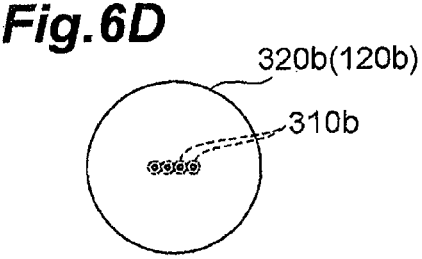
Figure 6E:
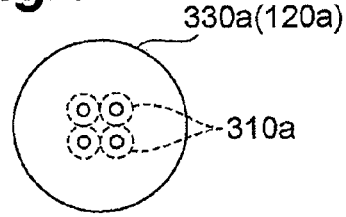

In the arrangement converter obtained via the above steps, a state is maintained where the respective one end faces 310b of the optical waveguide members 310 are one-dimensionally arrayed on the second end face 120b that corresponds to the front face 320b of the fixing member 320 (see FIG. 6D). On the other hand, a state is maintained where the other of the end faces 310a of the optical waveguide members 310 are two-dimensionally arrayed on the first end face 120a that corresponds to the front face 330a of the fixing member 330 (see FIG. 6E).

Note that the arrangement converter can be fabricated by means of a method other than the method described above. For example, after stacking bared optical fiber which have had the outermost resin layer removed in order to achieve a structure of the highest density, the array of bared optical fibers is partially replaced between one end of the fiber and the other so that the optical fiber end faces are one-dimensionally arrayed at one end and the optical fiber end faces are two-dimensionally arrayed at the other. The bundle of fibers (optical waveguide bundle) thus obtained is inserted in a silica glass pipe and the fiber bundle and pipe are integrated (heated). Another method that may be considered is a method in which the outer diameter of the pipe at the end of the integrated member (the core spacing at the end) is regulated to the desired value by heating and extending this integrated member. Regardless of the method used, it is clear that the number of cores is not limited to four and that a larger number of cores may also be adopted.

Modified Example of the Arrangement Converter

A modified example of the arrangement converter above (an embodiment of the arrangement converter according to the present invention) will be explained in detail next with reference to FIGS. 7A,7B, 8, 9A to 9C, 10, 11A to 11C, and 12A to 14.

Figure 7A:
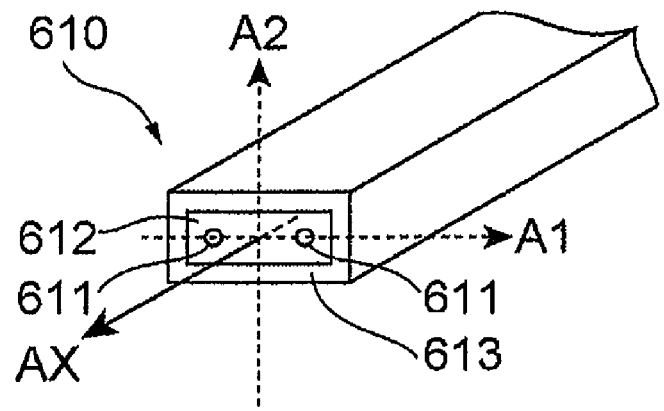
FIGS. 7A and 7B are view showing a structure of a dual-core rectangular fiber as a constituent part of a modified example of an arrangement converter according to the present invention.
Figure 7B:
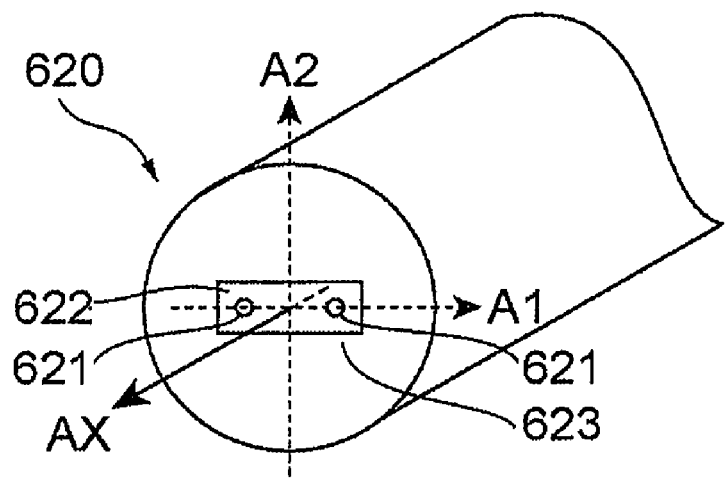

The arrangement converter according to this modified example is constituted by a dual-core rectangular fiber all or some of which has a rectangular cross-section, as shown in FIGS. 7A and 7B. More specifically, a dual-core rectangular fiber 610 shown FIG. 7A comprises two core regions 611 each extending along a predetermined axis AX and functioning as optical waveguide regions, a cladding region 612 integrally surrounding the two core regions 611, and a resin coating 613 provided on the outer periphery of the cladding region 612. In the dual-core rectangular fiber 610, the outer peripheral shape of the resin coating 613 corresponding to the outermost layer and the outer peripheral shape of the cladding region 612 are both formed into a substantially rectangular shape which is defined by a long-axis direction A1, which passes through the center of the two core region 611 and a short-axis direction A2, which is orthogonal to the long-axis direction A1 in the middle of the two core regions 611.

Meanwhile, a dual-core rectangular fiber 620, as shown in FIG. 713, comprises two core regions 621 each extending along a predetermined axis AX and functioning as optical waveguide regions, a cladding region 622 integrally surrounding these two core regions 621, and a resin coating 623 provided on the outer periphery of the cladding region 622. In the dual-core rectangular fiber 620, the outer peripheral shape of the resin coating 623 corresponding to the outermost layer is circular, but the outer peripheral shape of the cladding region 622 is formed into a substantially rectangular shape, which is defined by a long-axis direction A1 that passes through the center of the two core regions 621, and a short-axis direction A2 that is orthogonal to the long-axis direction A1 in the middle of the two core regions 621. Note that, in a case where the dual-core rectangular fiber 620 shown in FIG. 7B is used, the resin coating 623 on both ends of the prepared dual-core rectangular fiber 620 is removed in advance.

Figure 8:
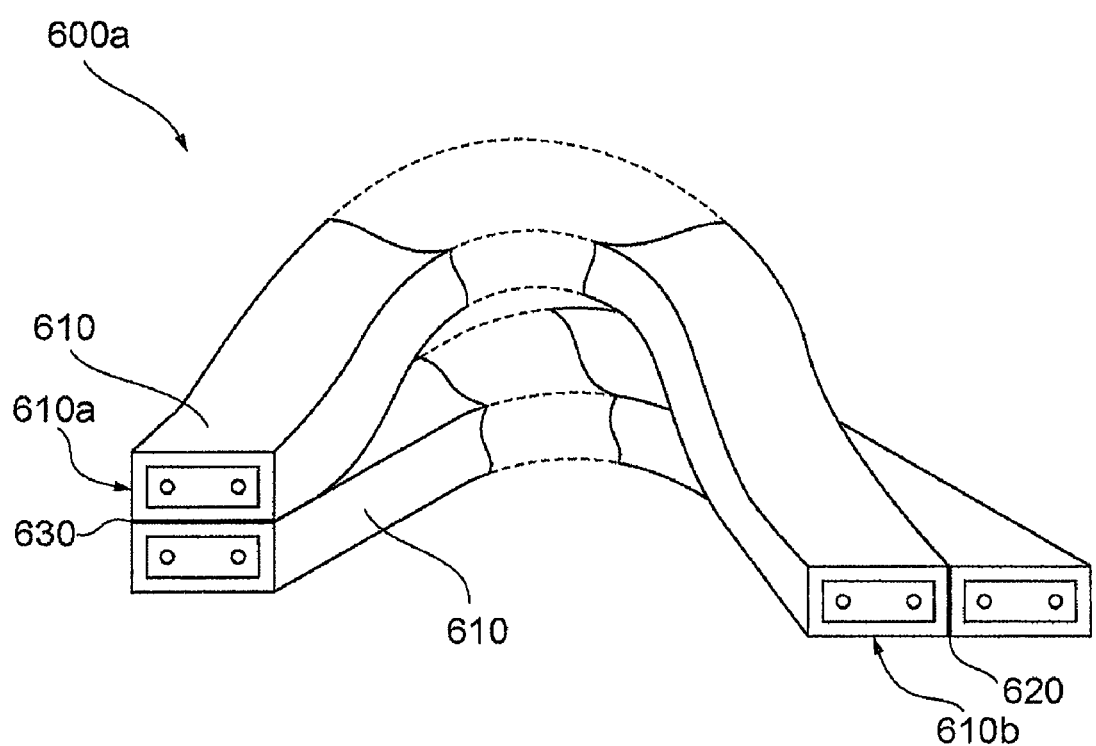
FIG. 8 is a view showing a schematic configuration of an arrangement converter for which a dual-core rectangular fiber with a rectangular outer peripheral shape is adopted as an arrangement converter according to a first modified example.

FIG. 8 is a view showing a schematic configuration of an arrangement converter 600a for which two dual core rectangular fibers 610 (see FIG. 7A) are adopted as the arrangement converter according to the first modified example. As shown in FIG. 8, respective one ends of the two prepared dual core rectangular fibers 610 are fixed via an adhesive 630 so as to be arrayed in the short-axis direction A2, whereby a first end face 610a is formed. Furthermore, the respective other ends of the two dual core rectangular fibers 610 are fixed via the adhesive 630 so as to be arrayed in the long-axis direction A1, whereby a second end face 610b is formed.

Figure 9A:
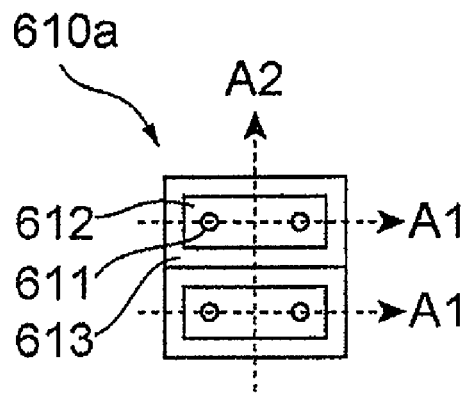
FIGS. 9A to 9C are view for explaining an end face structure of an arrangement converter according to the first modified example shown in FIG. 8.
Figure 9B:
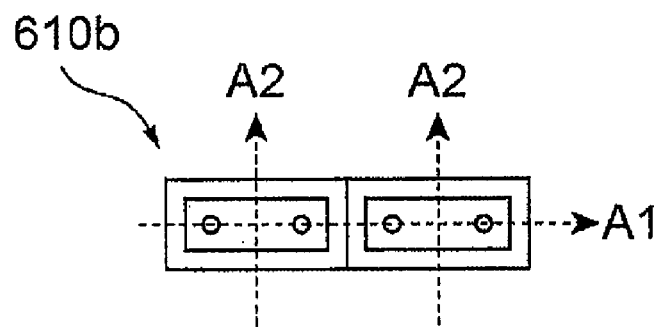
Figure 9C:
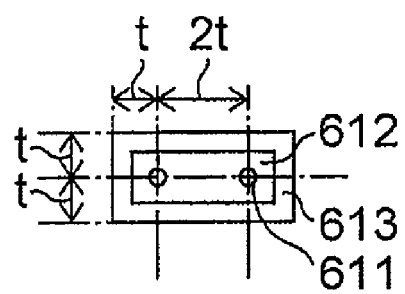

The configuration of the first and second end faces 610a and 610b formed as described above is shown in FIGS. 9A to 9C. Note that FIG. 9A shows an array state of core regions 611 of the first end face 610a, and FIG. 9B shows an array state of the core regions 611 in the second end face 610b. Furthermore, as shown in FIG. 9C, when the dispositional relationship between the outer peripheral shape of the resin coating 613 and the core regions 611 is set, in a case where the ends of the plurality of dual core rectangular fibers 610 are arrayed in the short axis direction A2, or arrayed in the long-axis direction A1, the spacing between the core regions 611 on either of the first and second end faces 610a and 610b can be set at a constant.

Figure 10:
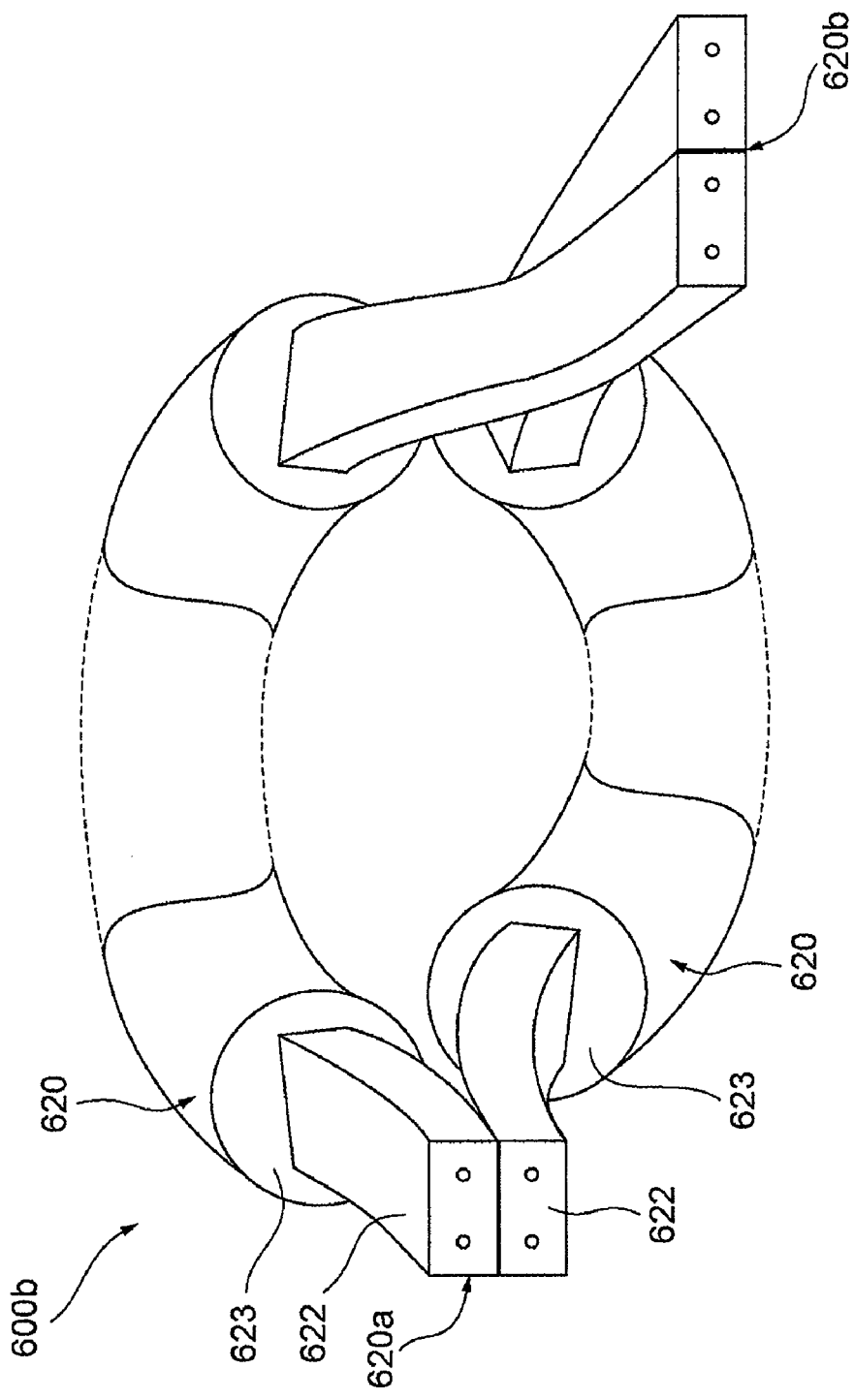
FIG. 10 shows the overall configuration of an arrangement converter for which a dual-core rectangular fiber that has a cladding with a rectangular outer peripheral shape is adopted as an arrangement converter according to the first modified example.

Next, FIG. 10 is a view showing a schematic configuration of an arrangement converter 600b, for which two dual core rectangular fibers 620 (see FIG. 7B) are adopted as the arrangement converter according to the first modified example. As shown in FIG. 10, the resin coating 623 located at both ends 620a and 620b of each of the two prepared dual core rectangular fibers 620 is removed, and then the cladding region 622 with which has a rectangular outer peripheral shape is exposed. In the arrangement converter 600b according to the first modified example shown in FIG. 10, the respective one ends of the two dual core rectangular fibers 620 are fixed by being fused (the ends are integrated) through heating in a state of being arrayed in the short axis direction A2, whereby the first end face 620a is formed. Furthermore, the respective other ends of the two dual-core rectangular fibers 620 are fixed by being fused (the ends are integrated) through heating in a state of being arrayed in the long-axis direction A1, whereby the second end face 620b is formed.

Figure 11A:
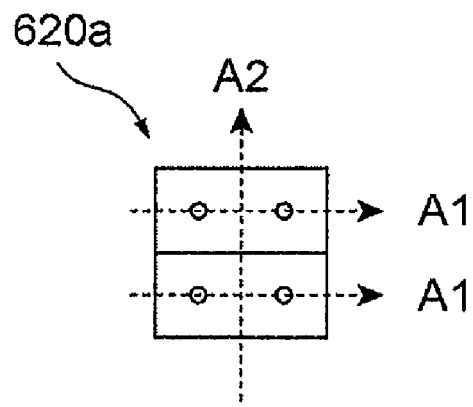
FIGS. 11A to 11C are views for explaining an end face structure of an arrangement converter according to the first modified example shown in FIG. 10.
Figure 11B:
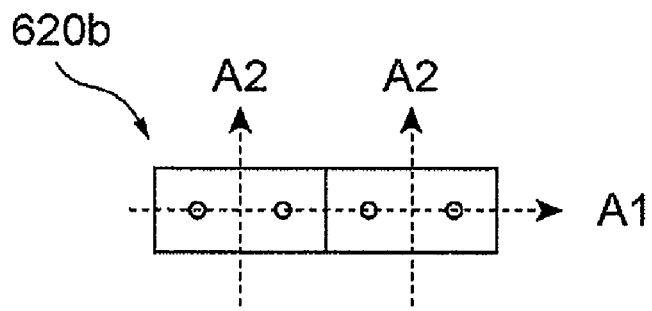
Figure 11C:
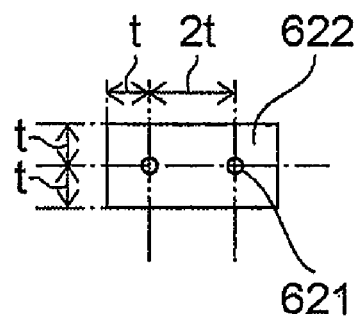

The configurations of the first and second end faces 620a and 620b, which are formed as described above, are shown in FIGS. 11A to 11C. Note that FIG. 11A is a view showing an array state of the core regions 621 of the first end face 620a, and FIG. 11B is a view showing an array state of the core regions 621 of the second end face 620b. Furthermore, as shown in FIG. 11C, when the dispositional relationship between the outer peripheral shape of the cladding region 622 from which the resin coating 623 has been removed, and the core regions 621 is set, in a case where the ends of the plurality of dual core rectangular fibers 620 are arrayed in the short-axis direction A2 or arrayed in the long-axis direction A1, the spacing between the core regions 621 can be set at a constant on either of the first and second end faces 620a and 620b.

Figure 12A:
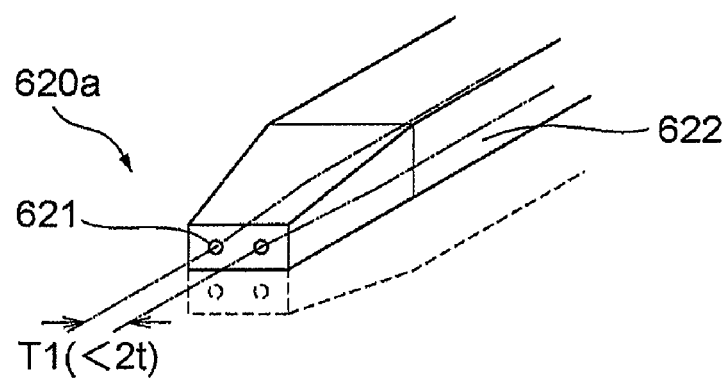
FIGS. 12A and 12B are views for explaining a core interval regulation at each of the end faces of an arrangement converter according to the first modified example shown in FIG. 10.
Figure 12B:
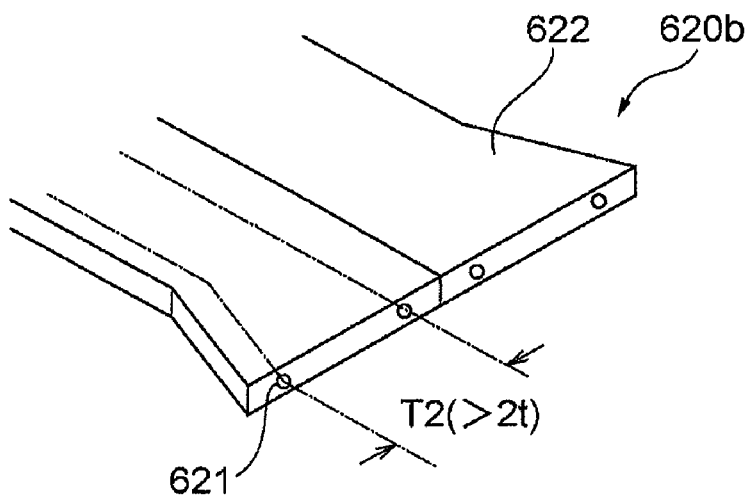

Note that the spacing between the core regions 621 of the respective end faces 620a and 620b can be optionally regulated. For example, an optical device for converting the spacing between the core regions 621 may be connected to at least one of the first and second end faces 620a and 620b. Alternatively, as shown in FIGS. 12A and 12B, by processing the ends of the two dual-core rectangular fibers 620 into a tapered shape in a state where the exposed cladding regions 622 are integrated, the spacing between the adjacent core regions 621 may also be regulated. Here, FIG. 12A shows a state where the spacing between the adjacent core regions 621 of the first end faces 620a is regulated, and FIG. 12B shows a state where the spacing between the adjacent core regions 621 of the second end faces 620b is regulated.

Figure 13A:
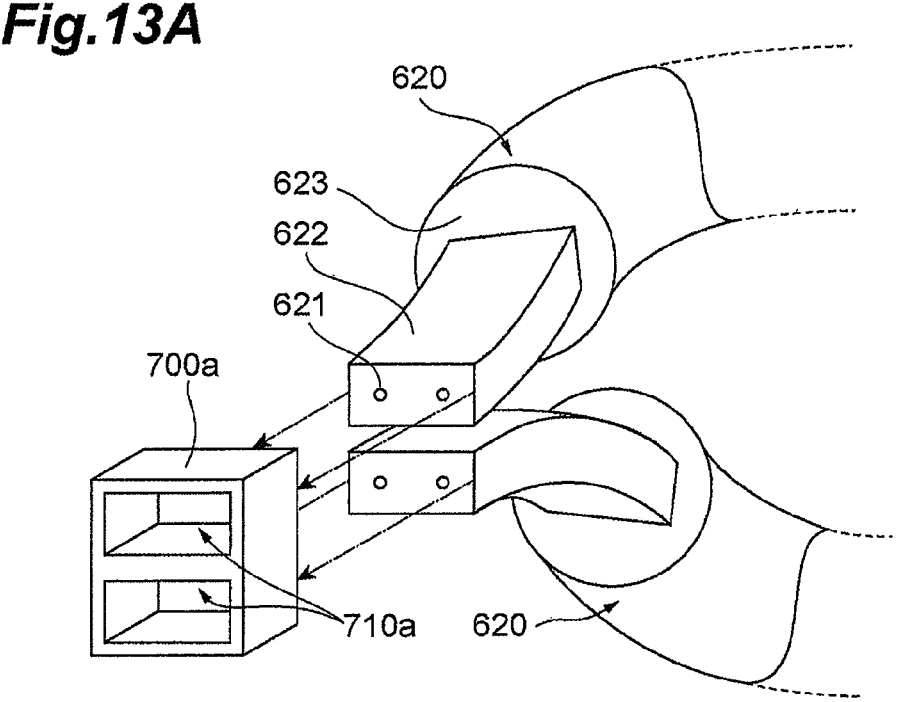
FIGS. 13A to 13C are views for explaining a schematic configuration of an arrangement converter according to a second modified example.
Figure 13B:
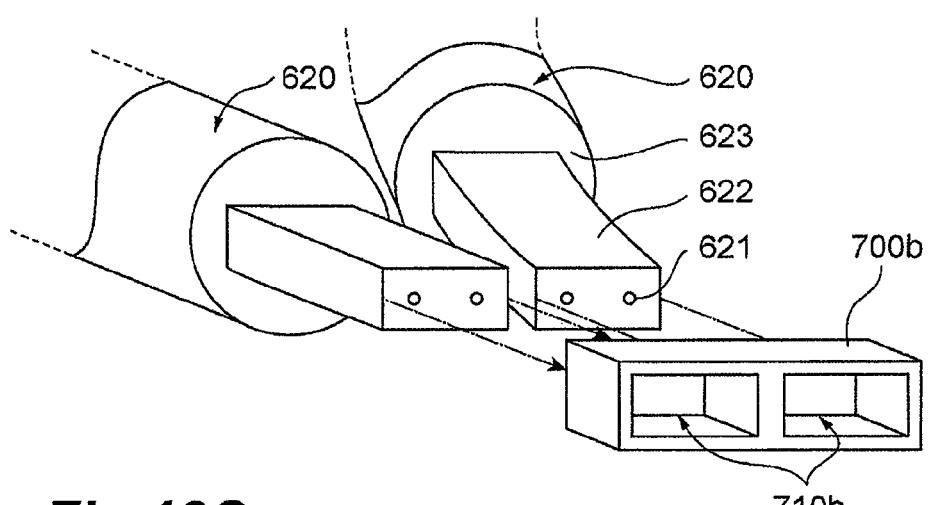
Figure 13C:
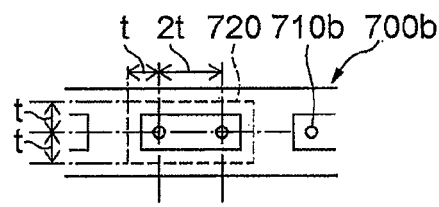

In addition, the arrangement converter according to a second modified example has a structure in which the two ends of the prepared dual-core rectangular fibers 620 (or the dual-core rectangular fibers 610 shown in FIG. 7A) are fixed by means of a guide member, as shown in FIGS. 13A to 13C.

Namely, as shown in FIG. 13A, the respective one ends of the two dual-core rectangular fibers 620 (the cladding regions 622 from which the resin coating 623 has been removed) are fixed by adhesive or the like in a state of being inserted in guide holes 710a that are provided in the first guide member 700a. Meanwhile, the respective other ends (the cladding regions 622 from which the resin coating 623 has been removed) of the two dual-core rectangular fibers 620 are fixed by adhesive or the like in a state of being inserted in guide holes 710b that are provided in a second guide member 700b, as shown in FIG. 13B. Note that the first guide member 700a is a member that holds the respective one ends of the two dual-core rectangular fibers 620 (the cladding regions 622) in a state of being arrayed in a short-axis direction A2. Moreover, the second guide member 700b is a member that holds the respective other ends (the cladding regions 622) of the two dual-core rectangular fibers 620 in a state of being arrayed in the long-axis direction A1.

The arrangement converter according to the second modified example is preferably designed such that the spacing between the adjacent core regions 621 is fixed when the first and second guide members 700a and 700b hold the respective ends of the dual-core rectangular fibers 620. In this case, as shown in FIG. 13C, the disposition of the core regions 621 with respect to the center (indicated by the broken line 720 in the figure) of the guide part that defines the guide holes 710a and 720b is determined. By designing the first and second guide members 700a and 700b in this manner, in a case where the ends of the dual-core rectangular fibers 620 are arrayed in the short-axis direction A2 or in the long-axis direction A1, the spacing between the core regions 621 can be set at a constant on either of the first and second end faces 620a and 620b.

Note that, although two dual-core rectangular fibers 610 (or 620) have been adopted for both the arrangement converters according to the first and second modified examples above, the arrangement converter of these modified examples can also be constituted by more than two dual-core rectangular fibers. For example, an arrangement converter (third modified example) may be constituted by eight dual-core rectangular fibers (either of the configurations of FIGS. 7A and 7B). FIGS. 14A to 14C each show, for the arrangement converter according to the third modified example, the disposition of the core regions 621 of each of the end faces in each case in an arrangement converter for which a dual-core rectangular fiber 620 having the structure shown in FIG. 7B has been adopted. In both FIGS. 14A and 14B, four dual-core rectangular fibers 620 are arranged in the short-axis direction A2 and two dual-core rectangular fibers 620 are arranged in the long-axis direction A1, whereby the first end face 620*a* of the arrangement converter according to the third modified example is configured. Here, FIGS. 14A and 14B show the respective ends of the eight prepared dual-core rectangular fibers 620 aligned with different orientations. Meanwhile, the second end face 620*b* of the arrangement converter according to the third modified example is constituted by arranging the other ends of the eight dual-core rectangular fibers 620 in the long-axis direction A1, as shown in FIG. 14C.

In addition, in the arrangement converter above (embodiments and modified examples thereof), in the second end face where the core regions are one-dimensionally arrayed, by optically linking the core spacing conversion device that is disclosed in Japanese Patent Application Laid-open Nos. 60-2307607, 62-297809, and 63-065412 and so forth to the core regions, the core regions are converted from a two-dimensional array to a one-dimensional array, thereby enabling spacing conversion between core regions. Further, in a case where a dual-core rectangular fiber 620 (see FIG. 7B) which has had the resin coating removed from the ends thereof is adopted, in an array converter according to the third modified example, the spacing between the core regions 621 on the first end face 620*a* side (the two-dimensional array side of the core regions 621) or on the second end face 620*b* side (one-dimensional array side of the core regions 621) can also be converted by integrating the ends (the exposed cladding regions 622) of the respective dual-core rectangular fibers 620 through heating and then extending the ends in a tapered shape, as shown in FIGS. 12A and 12B.

Second Embodiment of the Optical Communication System

Figure 15A:
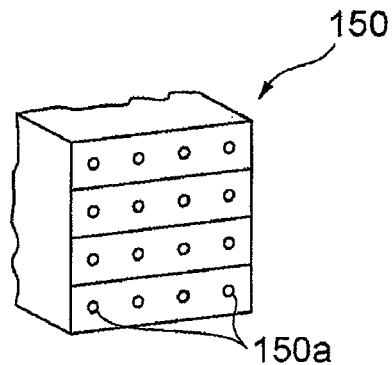
FIGS. 15A and 15B are views showing a configuration of a second embodiment of an optical communication system according to the present invention.
Figure 15B:
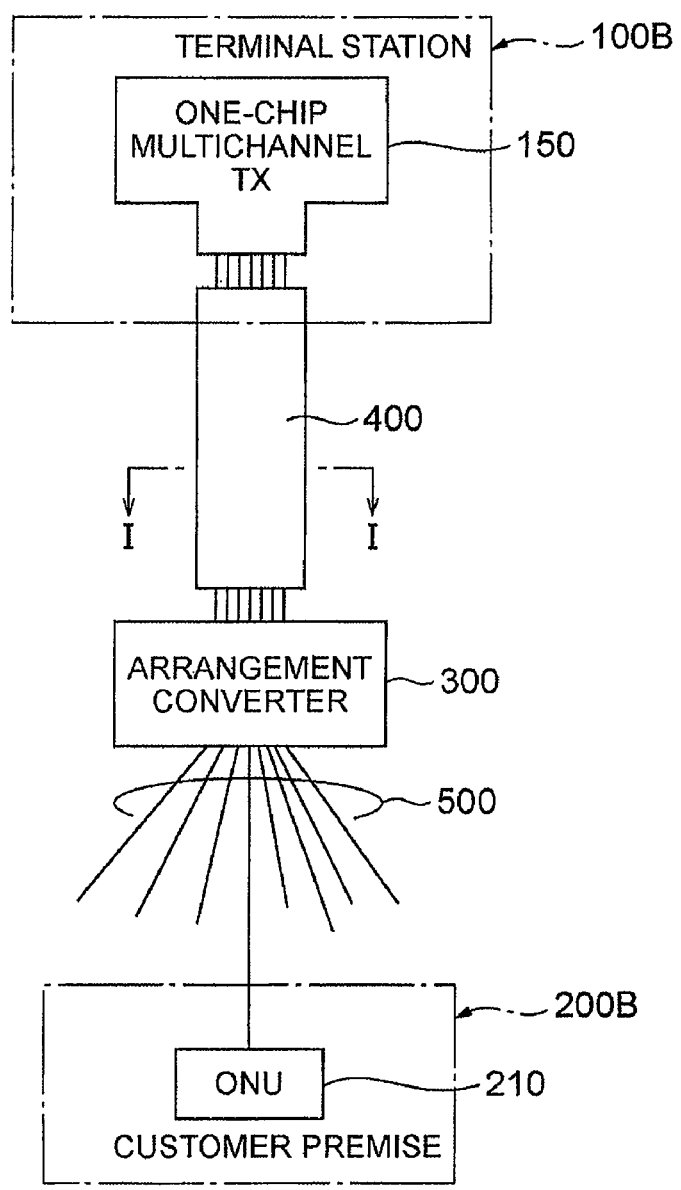

FIGS. 15A and 15B are views showing a configuration of a second embodiment of an optical communication system according to the present invention. The optical communication system according to the second embodiment is also an SS (Single Star) system that outputs a plurality of signal channels from a terminal station 100B serving as a transmitter station via a multicore fiber 400 in the same manner as in the first embodiment, wherein the SS system provides FTTH (Fiber To The Home) services, which enable optical communications between the terminal station 100B and a plurality of customers 200B.

Namely, the SS system according to the second embodiment comprises, as shown in FIG. 15B, a terminal station 100B (transmitter station), which is the final relay station of an existing communication system such as the Internet, a customer premises 200B (customer), and a multicore fiber 400, which constitutes part of an optical fiber network that is laid between the terminal station 100B and the customer premises 200B (customer), and which includes a plurality of cores (optical waveguide regions) that are two-dimensionally arrayed at both end faces.

The terminal station 100B comprises a one-chip multichannel light emitting device (TX) 150 in which sixteen light emitting areas are two-dimensionally arrayed. Namely, as shown in FIG. 15A, the one-chip multichannel light emitting device 150 includes a plurality of light emitting areas 150*a* that are two-dimensionally arrayed to coincide with the core array of the multicore fiber 400 shown in FIG. 5. Therefore, in the second embodiment, the one-chip multichannel light emitting device 150 shown in FIG. 15A corresponds to the optical device disposed on at least one end face side of the multicore fiber 400. Furthermore, the light emitting areas 150*a* each correspond to the plurality of light exit portions for emitting light that is intended to reach each of the plurality of cores of the multicore fiber 400.

Thus, in accordance with the configuration of the second embodiment, the arrangement converter 120 in the terminal station 100A of the first embodiment shown in FIG. 1 is unnecessary, and the respective light emitting areas 150*a* of the one-chip multichannel light emitting devices 150 can be optically linked directly to the cores of the multicore fiber 400.

Note that, in the second embodiment, an ONU 210 is provided on the customer premises 200B. Furthermore, in order to optically link the light exit face of the multicore fiber 400 to the ONU 210 of the customer premises 200B, an arrangement converter 300 is provided between one of the end faces of the multicore fiber 400 and the customer premises 200B. The arrangement converter 300 and each of the customer premises 200B are optically connected by the respective optical fibers that constitute the tape fiber.

Third Embodiment of the Optical Communication System

Figure 16A:
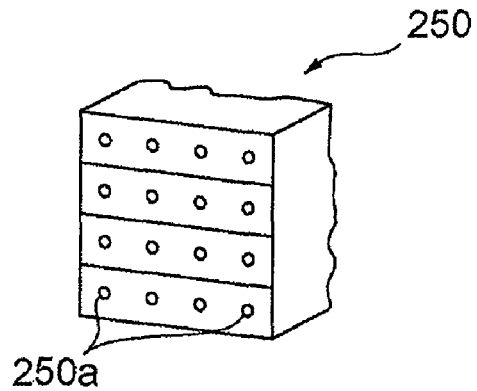
FIGS. 16A and 16B are views showing a configuration of a third embodiment of an optical communication system according to the present invention.
Figure 16B:
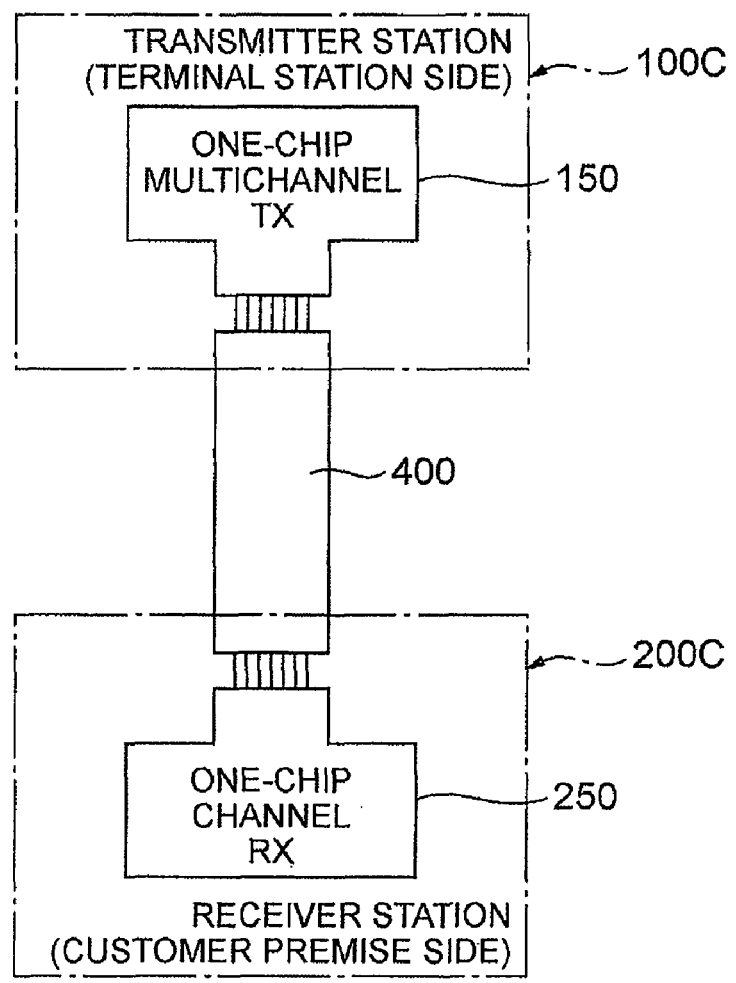

FIGS. 16A and 16B are views showing a configuration of a third embodiment of the optical communication system according to the present invention. The optical communication system according to the third embodiment is a many-to-many large-capacity optical communication system that is capable of transmitting and receiving a plurality of signal channels via the multicore fiber 400 and, as shown in FIG. 16B, comprises a transmitter station 100C, a receiver station 200C, and a multicore fiber 400 which constitutes part of an optical fiber network that is laid between the transmitter station 100C and the receiver station 200C (receiver station) and which includes a plurality of cores (optical waveguide regions) that are two-dimensionally arrayed on both end faces thereof. However, the optical communication system according to the third embodiment differs from that of the second embodiment in that the receiver station 200C of the former comprises a one-chip multichannel light receiving device 250 that includes a plurality of two-dimensionally arrayed light receiving areas 250*a* (each of which corresponds to each core of the multicore fiber 400).

In the optical communication system according to the third embodiment, the terminal station 100C comprises a one-chip multichannel light emitting device (TX) 150 (FIG. 15A) in which sixteen light emitting areas 150*a* are two-dimensionally arrayed, as per the second embodiment. Hence, the plurality of light emitting areas 150*a* of the one-chip multichannel light emitting device 150 are two-dimensionally arrayed to coincide with the core array of the multicore fiber 400 shown in FIG. 5. At this time, the one-chip multichannel light emitting device 150 in the transmitter station 100C corresponds to the optical device that is installed on at least one end face side of the multicore fiber 400. Furthermore, the light emitting areas 150*a* each correspond to a plurality of light exit portions that emit light that is intended to reach each of the plurality of cores in the multicore fiber 400. Thus, in the third embodiment, the arrangement converter 120 in the terminal station 100A of the first embodiment shown in FIG. 1 is unnecessary, and each of the light emitting areas 150a in the one-chip multichannel light emitting device 150 can be optically linked directly to each of the cores in the multicore fiber 400.

Meanwhile, the receiver station 200C comprises a one-chip multichannel light receiving device (RX) 250 (FIG. 16A) in which sixteen light receiving areas 250a are two-dimensionally arrayed. Hence, the plurality of light receiving areas 250a of the one-chip multichannel light receiving device 250 are two-dimensionally arrayed to coincide with the core array of the multicore fiber 400 shown in FIG. 5. Here, the one-chip multichannel light receiving device 250 in the receiver station 200C corresponds to the optical device that is installed on at least one end face side of the multicore fiber 400. Thus, in the third embodiment, neither the arrangement converter 120 in the terminal station 100A of the first embodiment shown in FIG. 1 nor the arrangement converter 300 of the first and second embodiments is required. Hence, the light receiving areas 250a in the one-chip multichannel light receiving device 250 can be optically linked directly to the cores in the multicore fiber 400.

In particular, the configuration of the third embodiment described above is not a one-to-many configuration as per the customer system of the first and second embodiments or the like, but rather is effective in an optical communication system of a one-to-one configuration for which an increased communication capacity is desired.

In accordance with the optical communication system according to the present invention, a multicore fiber in which a plurality of cores are two-dimensionally arrayed can be applied to a communication optical transmission line by providing an optical device with a special structure in at least one of the multicore fibers. Moreover, with an arrangement converter according to the present invention, which can be adopted as an optical device in this optical communication system, a favorable optical link is possible between various network resources that are to be optically linked such as light emitting devices and light receiving devices, and the conventional restrictions governing the number of optical waveguides can be relaxed. An arrangement converter with the above structure can thus be adopted for an optical communication system that is constituted by a variety of network resources.

What is claimed is:

1. An arrangement converter for converting a core array within a multicore fiber into a different array, the arrangement converter comprising:
   first and second end faces being disposed so as to optically face each other; and
   a plurality of optical waveguides each having a first end fixed on the first end face and a second end fixed on the second end face, the plurality of optical waveguides being individually formed for each core or for every two cores,
   wherein an array on the first end face, defined by the first ends of the plurality of optical waveguides, is different from that on the second end face defined by the second ends of the plurality of optical waveguides, and
   wherein the array on the first end face is a two-dimensional array and the array on the second end face is a one-dimensional array.

2. The arrangement converter according to claim 1, wherein a spacing between adjacent optical waveguides stays constant on each end face thereof and differs between the first and second end faces.

3. The arrangement converter according to claim 1, wherein outer diameters of the respective core regions of the plurality of optical waveguides are larger on the second end face than on the first end face.

4. The arrangement converter according to claim 1, further comprising a plurality of dual-core rectangular fibers that comprises: two core regions each extending along a predetermined direction and functioning as an optical waveguide; a cladding region integrally surrounding the two core regions; and a resin coating provided on an outer periphery of the cladding region, an outer peripheral shape of the cladding region or an outer peripheral shape of the resin coating in a plane that is orthogonal to a predetermined direction being formed into a substantially rectangular shape which is defined by a long-axis direction that passes through a center of the two core regions and a short-axis direction that is orthogonal to the long-axis direction in the middle of the two core regions,
   wherein the respective one ends of the plurality of dual-core rectangular fibers are disposed such that the short-axis directions thereof coincide with each other as the first end face, and the respective other ends of the plurality of dual-core rectangular fibers are disposed such that the long-axis directions thereof coincide with each other as the second end face.

5. The arrangement converter according to claim 4, wherein, on at least one of the first and second end faces, the respective ends of the plurality of dual-core rectangular fibers are disposed in a state of contact with each other.

6. The arrangement converter according to claim 4, further comprising a guide member holding, on at least one of the first and second end faces, the respective ends of the plurality of dual-core rectangular fibers in a state where an array condition is maintained.

7. The arrangement converter according to claim 4, wherein a spacing between adjacent core regions stays constant on at least one of the first and second end faces.

8. The arrangement converter according to claim 6, wherein the guide member is designed such that a spacing between adjacent core regions stays constant when the guide member holds the respective ends of the plurality of dual-core rectangular fibers.

9. The arrangement converter according to claim 4, wherein a spacing between adjacent core regions on at least one of the first and second end faces is regulated by connecting at least one of the first and second end faces to an optical device for converting the core region spacing.

10. The arrangement converter according to claim 4, wherein a spacing between adjacent core regions on at least one of the first and second end faces is regulated by processing the ends of the plurality of dual-core rectangular fibers into a tapered shape in a state where the respective cladding regions having a substantially rectangular cross-section are integrated.

11. The arrangement converter according to claim 1, wherein, on the first end face, the end faces of the plurality of optical waveguides are arranged so that each of the end faces matches an associated one of a plurality of cores of a multicore fiber, the plurality of core being arranged within a single cladding of the multicore fiber as optical waveguides optically independent of each other.

12. The arrangement converter according to claim 1, wherein, in each core region of the plurality of optical waveguides, a diameter thereof on the second end face is larger than that on the first end face.

13. The arrangement converter according to claim 1, wherein each of the first and second end faces includes a plate-shaped member.

14. An optical communication system, comprising:

the arrangement converter according to claim 1;

a multicore fiber including a plurality of cores within a single cladding thereof, each of the plurality of cores functioning as optically independent optical waveguides, the multicore fiber having a cross-section in which the plurality of cores are two-dimensionally arrayed; and an optical device having a plurality of light transmission areas arrayed so as to be different from a core array of the multicore fiber, wherein the first end face of the arrangement converter faces an end face of the multicore fiber, wherein the second end face of the arrangement converter faces the optical device, wherein, in the plurality of optical waveguides of the arrangement converter, the array on the first end face coincides with an array of the plurality of cores of the multicore fiber and the array on the second end face coincides with an array of the plurality of light transmission areas.

* * * * *